United States Patent
Golovinsky et al.

(10) Patent No.: US 7,742,423 B2
(45) Date of Patent: Jun. 22, 2010

(54) METHOD OF HEURISTIC DETERMINATION OF NETWORK INTERFACE TRANSMISSION MODE AND APPARATUS IMPLEMENTING SUCH METHOD

(75) Inventors: Eugene Golovinsky, Houston, TX (US); Zsolt Lukacs, The Woodlands, TX (US); Wesley J. Noonan, Missouri City, TX (US)

(73) Assignee: BMC Software, Inc., Houston, TX (US)

( * ) Notice: Subject to any disclaimer, the term of this patent is extended or adjusted under 35 U.S.C. 154(b) by 1245 days.

(21) Appl. No.: 10/794,090

(22) Filed: Mar. 5, 2004

(65) Prior Publication Data

US 2005/0195746 A1    Sep. 8, 2005

(51) Int. Cl.
G01R 31/08     (2006.01)
H04L 5/14      (2006.01)
G06F 11/00     (2006.01)
H04B 7/005     (2006.01)

(52) U.S. Cl. ............. 370/241; 370/276; 370/252; 370/278

(58) Field of Classification Search ......... 370/241, 370/252, 254, 255, 276, 234, 235, 229, 278, 370/296, 298, 445; 709/224
See application file for complete search history.

(56) References Cited

U.S. PATENT DOCUMENTS

| | | | | |
|---|---|---|---|---|
| 5,561,666 A * | 10/1996 | Christensen et al. | | 370/276 |
| 5,610,903 A * | 3/1997 | Crayford | | 370/213 |
| 5,673,253 A * | 9/1997 | Shaffer | | 370/229 |
| 5,761,438 A * | 6/1998 | Sasaki | | 709/247 |
| 5,812,525 A * | 9/1998 | Teraslinna | | 370/229 |
| 5,825,755 A * | 10/1998 | Thompson et al. | | 370/296 |
| 6,222,850 B1 * | 4/2001 | Johnson | | 370/445 |
| 6,421,541 B1 * | 7/2002 | Karlsson et al. | | 455/509 |
| 6,580,697 B1 * | 6/2003 | Gardner et al. | | 370/296 |
| 6,665,275 B1 * | 12/2003 | Davy et al. | | 370/282 |
| 6,885,641 B1 * | 4/2005 | Chan et al. | | 370/252 |
| 6,938,086 B1 * | 8/2005 | Banga | | 709/227 |
| 7,420,938 B2 * | 9/2008 | Scaglione et al. | | 370/296 |
| 7,636,327 B1 * | 12/2009 | Doran | | 370/276 |
| 2003/0043741 A1 * | 3/2003 | Mukai et al. | | 370/229 |
| 2003/0198247 A1 * | 10/2003 | Gardner et al. | | 370/445 |
| 2003/0235209 A1 * | 12/2003 | Garg et al. | | 370/468 |

(Continued)

OTHER PUBLICATIONS

Patrol Dashboard Technical Bulletin, Version 6.6.00, Apr. 24, 2003; Patch available for Multiple Fixes.
RFC 2233. The Interfaces Group MIB using SMI v2, Nov. 1997.

*Primary Examiner*—Steven H Nguyen
*Assistant Examiner*—Candal Elpenord
(74) *Attorney, Agent, or Firm*—Wong, Cabello, Lutsch, Rutherford & Brucculeri, LLP

(57) ABSTRACT

A method for measuring and determining the duplex modes of a network interface. The method assumes the network interface to be operating in a half-duplex mode until the bandwidth utilization reaches a threshold. When the threshold is reached, the method checks the traffic collision in the interface. If there is no collision, then the duplex mode is determined to be full-duplex. If there is collision, then the duplex mode is determined to be half-duplex and an alarm is set off. In another embodiment, the interface type is determined through SNMP. If the interface is a WAN interface, then the interface is determined to be full-duplex.

49 Claims, 3 Drawing Sheets

U.S. PATENT DOCUMENTS

| | | | |
|---|---|---|---|
| 2004/0218529 A1* | 11/2004 | Rodosek et al. | 370/235 |
| 2005/0073955 A1* | 4/2005 | MacLean et al. | 370/235 |
| 2005/0207360 A1* | 9/2005 | Costo et al. | 370/282 |
| 2006/0235654 A1* | 10/2006 | Parnes | 702/186 |
| 2007/0054645 A1* | 3/2007 | Pan | 455/266 |
| 2007/0121525 A1* | 5/2007 | Jenster | 370/252 |
| 2007/0133402 A1* | 6/2007 | Lee et al. | 370/229 |
| 2007/0159965 A1* | 7/2007 | Kopf et al. | 370/229 |

* cited by examiner

METHOD OF HEURISTIC DETERMINATION OF NETWORK INTERFACE TRANSMISSION MODE AND APPARATUS IMPLEMENTING SUCH METHOD

BACKGROUND OF THE INVENTION

1. Field of the Invention

This invention relates to the determination of network interface transmission modes and the calculation of bandwidth utilization in a network interface.

2. Description of the Related Art

In a digital network, each device connected to a network does so through an interface. The interface acts as communication gateway from one device to another. Computer network communication may comply with a particular network protocol such that inter-device communication can take place. When a network grows larger, it becomes necessary to manage each device (node) within the network and the overall network. One such standard for managing a network is the Simple Network Management Protocol (SNMP). Under the SNMP architecture, small management programs known as agents, run in, each managed node such as, for example, network interface cards, servers and routers. Agents monitor their devices and gather statistical information in a format known as Management Information Base (MIB). A central management console program typically calls the agent on a regular basis and downloads the contents of the managed device's MIB.

As a computer network may be built over time, the computer within the network or the interfaces on each computer may vary. One aspect of the interface that can vary is the transmission modes that an interface can support. The communication mode an interface can support can be a full-duplex or half-duplex. In full-duplex, an interface can transmit and receive information at the same time. In half-duplex, an interface can receive or transmit data one at a time but not simultaneously. The interface may also be operating in a simplex mode, where the interface can communicate data only in one direction, either sending or receiving. The operational mode an interface can support may be coded into the MIB on the interface as described in IETF RFC 2233, published in November 1997. Since it is not mandatory to keep or store an interface's operational mode in its associated MIB, most hardware interfaces do not keep such information in MIB. Therefore, the information in MIB alone is not a reliable indication whether a hardware interface can support either the half-duplex or the more advanced full-duplex mode.

In many modern network interfaces, the full-duplex mode is supported in hardware. Because of the mixture of equipment in any particular network system, to make the computer network system operable, many network managers set the default mode for any interfaces to auto-detect and use full-duplex mode if possible and half-duplex mode if not. When an interface is operating in a half-duplex mode the available bandwidth is much less than when the interface is operating in the full-duplex mode, as little as 20 to 30 percent of the full-duplex mode.

In a managed network, bandwidth utilization is a key metric to the health or operational state of the network. The bandwidth utilization of an interface indicates whether the network interface or that portion of the network is light in network traffic, fully loaded or in need of additional capacity. It will be recognized that bandwidth utilization may be calculated from the traffic data through the interface and depends on which mode the interface is operating in. When the bandwidth utilization at a particular interface reaches a certain level, the agent or the management console will typically raise an alarm. This may cause the network manager to reroute network traffic flow to force a reduction in bandwidth utilization so as to avoid network traffic breakdown. This will reduce the network's effective bandwidth utilization. Typically, changing interfaces or increasing their capacity in a business enterprise network system is complex and costly. Thus, it would be very beneficial to accurately calculate the bandwidth utilization and plan the network interface capacity accordingly.

Therefore, it is desirable to have a reliable technique to determine the actual capability of a particular interface in a digital network system, such as a business enterprise network system. It is also desirable not to disturb the network system or create a large amount of network management overhead in determining the actual interface capability.

BRIEF SUMMARY OF THE INVENTION

The present invention uses a heuristic method to dynamically determine the mode a network interface is operating in. A network monitor receives information from an SNMP agent on the interface regarding the in-coming and out-going data traffic through the interface, and calculates an initial bandwidth utilization using a half-duplex mode formula. If the calculated bandwidth utilization is low, nothing is done. If the calculated bandwidth utilization is at or above a user-specified threshold, a check is made to determine if the interface is experiencing transmission data collisions. If collisions are detected, the operating mode is determined to be half-duplex mode. In one embodiment, an alarm is triggered to warn of the detected high bandwidth utilization condition. If no collisions are detected (or fewer than a specified number or rate thereof), the operating mode is determined to be full-duplex mode. The formula for bandwidth utilization is changed accordingly.

In another embodiment of the present invention, the interface is first determined to be either a Local Area Network ("LAN") or a Wide Area Network ("WAN") interface in accordance with SNMP procedures. If the interface is a WAN interface, the operating mode is determined to be full-duplex mode. If the interface is a LAN interface, a dynamic determination is carried out in accordance with the first embodiment of the invention.

The current invention may be embedded in a machine executable program. It may also be embedded in a machine readable medium that contains the machine executable program.

BRIEF DESCRIPTION OF THE SEVERAL VIEWS OF THE DRAWINGS

A better understanding of the invention can be had when the following detailed description of the preferred embodiments is considered in conjunction with the following drawings, in which.

DETAILED DESCRIPTION OF THE INVENTION

Figure 1:
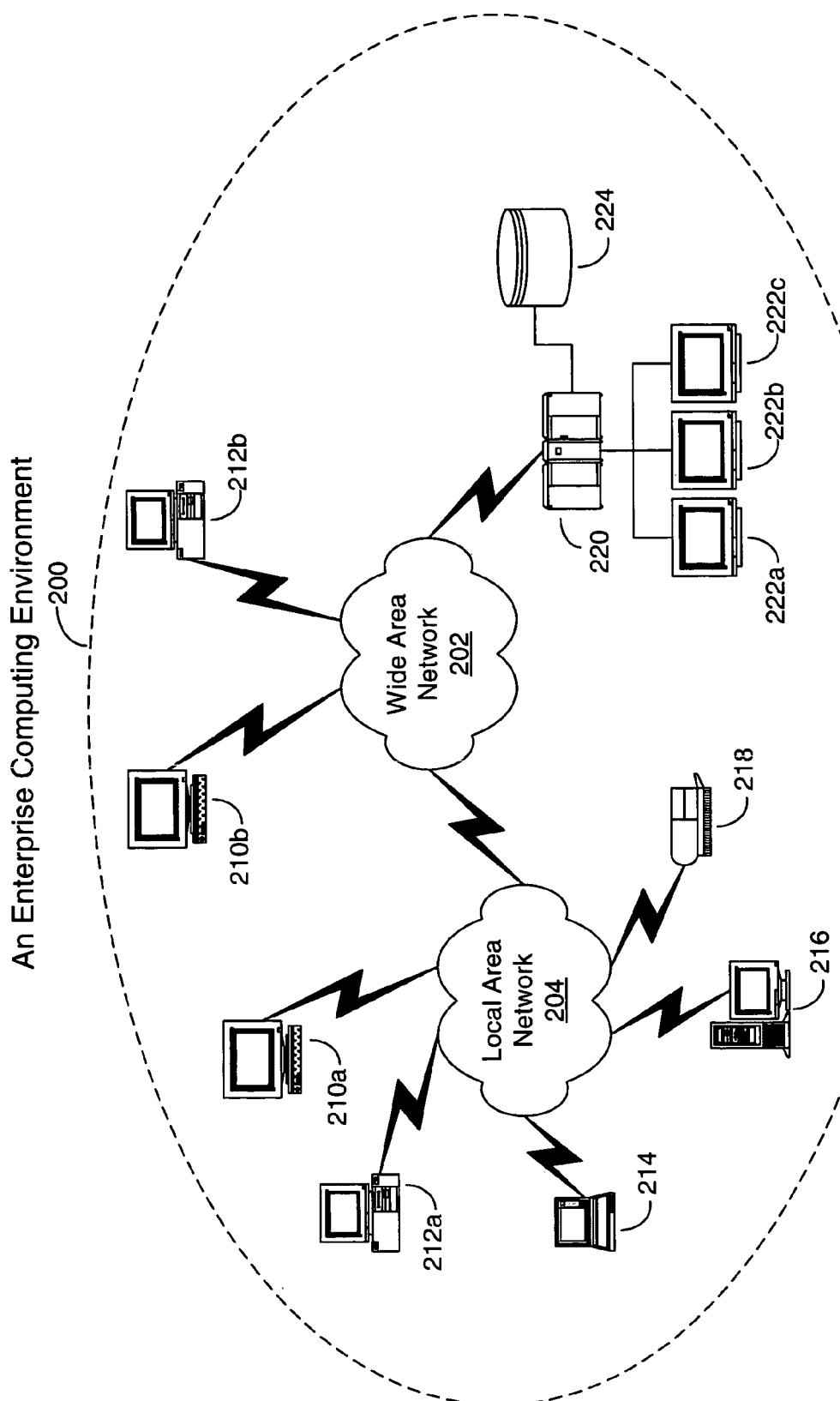
FIG. 1 depicts a generic network system.

FIG. 1 illustrates a generic enterprise computing environment or network system 200. An enterprise 200 comprises a plurality of computer systems such as computer system 100 which are interconnected through one or more networks. The enterprise 200 may comprise a variety of heterogeneous computer systems and networks which are interconnected in a variety of ways and which run a variety of software applications.

One or more local area networks (LANs) 204 may be included in the enterprise 200. A LAN 204 is a network that spans a relatively small area. Typically, a LAN 204 is confined to a single building or group of buildings. Each node (i.e., individual computer system or device) on a LAN 204 preferably has its own CPU with which it executes computer programs. Often, each node is also able to access data and devices anywhere on the LAN 204. The LAN 204 thus allows many users to share devices (e.g., printers) as well as data stored on file servers. The LAN 204 may be characterized by any of a variety of topologies (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves). FIG. 1 illustrates an enterprise 200 including one LAN 204. However, the enterprise 200 may include a plurality of LANs 204 which are coupled to one another through a wide area network (WAN) 202. A WAN 202 is a network that spans a relatively large geographical area. One illustrative WAN is the Internet.

Each LAN 204 comprises a plurality of interconnected computer systems or at least one computer system and at least one other device. Computer systems and devices which may be interconnected through the LAN 204 may include, for example, one or more of a workstation 210a, a personal computer 212a, a laptop or notebook computer system 214, a server computer system 216, or a network printer 218. The example LAN 204 illustrated in FIG. 1 comprises one of each of these computer systems 210a, 212a, 214, and 216 and one printer 218. The LAN 204 may be coupled to other computer systems and/or other devices and/or other LANs 204 through a WAN 202.

A mainframe computer system 220 may optionally be coupled to the enterprise 200. As shown in FIG. 1, the mainframe 220 is coupled to the enterprise 200 through the WAN 202, but alternatively the mainframe 220 may be coupled to the enterprise 200 through a LAN 204. As shown in FIG. 1, the mainframe 220 is coupled to a storage device or file server 224 and mainframe terminals 222a, 222b, and 222c. The mainframe terminals 222a, 222b, and 222c access data stored in the storage device or file server 224 coupled to or comprised in the mainframe computer system 220.

The enterprise 200 may also comprise one or more computer systems which are connected to the enterprise 200 through the WAN 202: as illustrated, a workstation 210b and a personal computer 212b. In other words, the enterprise 200 may optionally include one or more computer systems which are not coupled to the enterprise 200 through a LAN 204. For example, the enterprise 200 may include computer systems which are geographically remote and connected to the enterprise 200 through the Internet.

When the computer programs are executed on one or more computer systems, an enterprise management system may be operable to monitor, analyze, and/or manage the computer programs, processes, and resources of the enterprise 200. Typically, each computer system in the enterprise 200 executes or runs a plurality of software applications or processes. Each software application or process consumes a portion of the resources of a computer system and/or network. For example, CPU time, system memory such as RAM, non-volatile memory such as a hard disk, network bandwidth, and input/output (I/O) resources. The enterprise management system permits users, usually network administrators, to monitor, analyze, and manage resource usage on heterogeneous computer systems across the enterprise 200.

Figure 2:
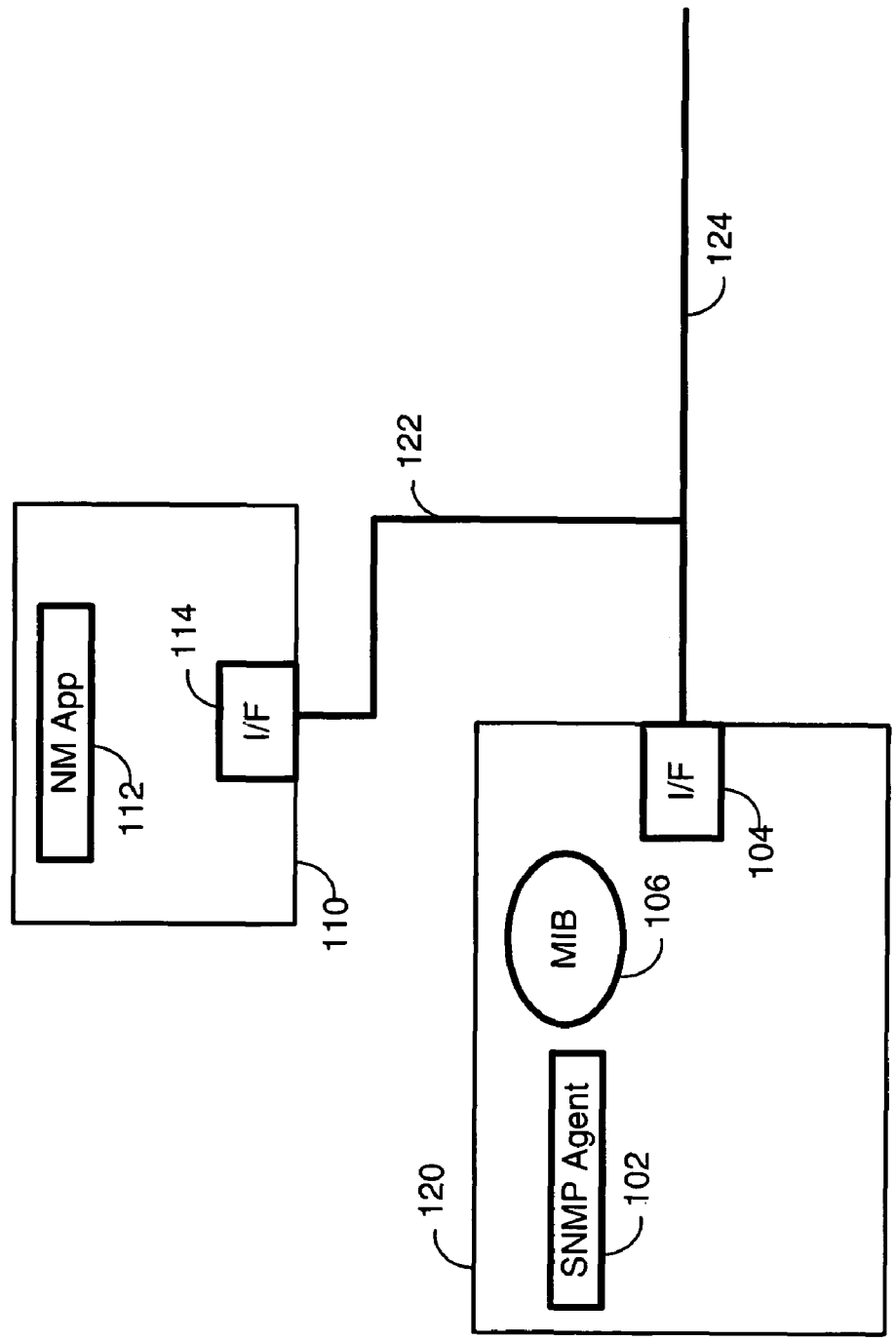
FIG. 2 depicts a network interface, a network agent and a network manager.

FIG. 2 illustrates the connection between a network device 120 and a network manager console 110, through network interfaces 104 and 114, and medium 122. Each of devices 110 and 120 may be connected to other devices through medium 124. On device 120, network management agent 102, collects operating metrics for device 120 and reports these metrics to the network manager 110. The Network manager application 112 on device 110 will process the metrics received from agents on devices within the network (including those from device 120). A Management Information Base 106 (MIB) is usually maintained on the network device 120, which keeps track of the operating metrics collected by agent 102 so that the device 120 can provide these metrics to network manager 110 whenever the network manager 110 requests such information. The modules shown in FIG. 2 are for illustration purposes only and do not necessarily reflecting the physical arrangement of the various network devices. For example, there may be more than one network interface on a device 120. The network agent 102 or SNMP agent as shown may physically reside on the memory inside the network interface 104 or outside the interface 104.

As discussed above, one of the metrics that network administrators use to monitor and diagnose the performance of their network and network devices is the bandwidth utilization of an interface. Traffic through an interface is considered to be input or output traffic depending on the flow of the traffic through the interface. The maximum rate at which network interfaces can transmit and/or receive traffic is referred to as its bandwidth. For example, FastEthernet has a bandwidth of 100 Mbps: this is the maximum rate at which the interface can transmit or receive. Network interfaces also have the ability to transmit and receive data in multiple modes, simplex, half-duplex and full-duplex. In one embodiment, SNMP is used to retrieve the data needed to determine the bandwidth utilization of the interface.

The duplex mode of an interface creates a unique problem for calculating bandwidth utilization. One of ordinary skill in the art will recognize that the bandwidth utilization of a half-duplex interface may be calculated in accordance with equation 1.

$$BandwidthUtilization = \frac{(\Delta ifInOctets + \Delta ifOutOctets) \times 8 \times 100}{(\Delta t) \times ifSpeed} \quad \text{Equation 1}$$

As used in Equation 1: $\Delta t$ represent the measurement time period in seconds; $\Delta ifInOctets$ represents the number of Octets the interface received during $\Delta t$ seconds; $\Delta ifOutOctets$ represents the number of Octets the interface transmitted during $\Delta t$ seconds; and ifSpeed represents the transmission speed of the interface in bits per second. One Octet is one byte or eight (8) bits of data transmitted through the interface. These four parameters may be sampled by the agent associated with a network interface and can be passed to the network monitor upon request. Since half-duplex systems can not transmit and receive at the same time, bandwidth utilization according to Equation 1 cannot exceed 100%.

Full-duplex mode presents a problem when calculating bandwidth utilization because the interface can transmit and receive data at the same time and at the same rate as the available bandwidth. Accordingly use of the half-duplex calculation given by Equation 1 could cause the calculated bandwidth utilization to be greater than 100%. As a result, one may use the generally accepted method of calculating the bandwidth utilization for full-duplex interfaces formulas shown in Equation 2.

$$FullDuplexBandwidthUtilization = \frac{Max(\Delta ifInOctets, \Delta ifOutOctets) \times 8 \times 100}{(\Delta t) \times ifSpeed}$$ Equation 2

As used in Equation 2, the four parameters (Δt, ΔifInOctets, ΔifOutOctets and ifSpeed) are the same as in Equation 1. The function Max(a,b) returns the larger of the values represented by the value 'a' and the value 'b'. Calculations in accordance with Equation 2 provide the bandwidth utilization of the maximum of either the input or the output utilization, while masking the lower utilization traffic.

A problem in prior art practice is that there is no standard method for determining the duplex setting of an interface. Traditionally, most network management vendors either use SNMP as a method to determine duplex mode, or they simply do not do it at all, because the SNMP data field supplying the duplex mode of an interface is not widely supported and those devices that do support it do not reliably support it. The present invention discloses methods that examine several interface metrics to dynamically determine an interface's operational mode.

Figure 3:
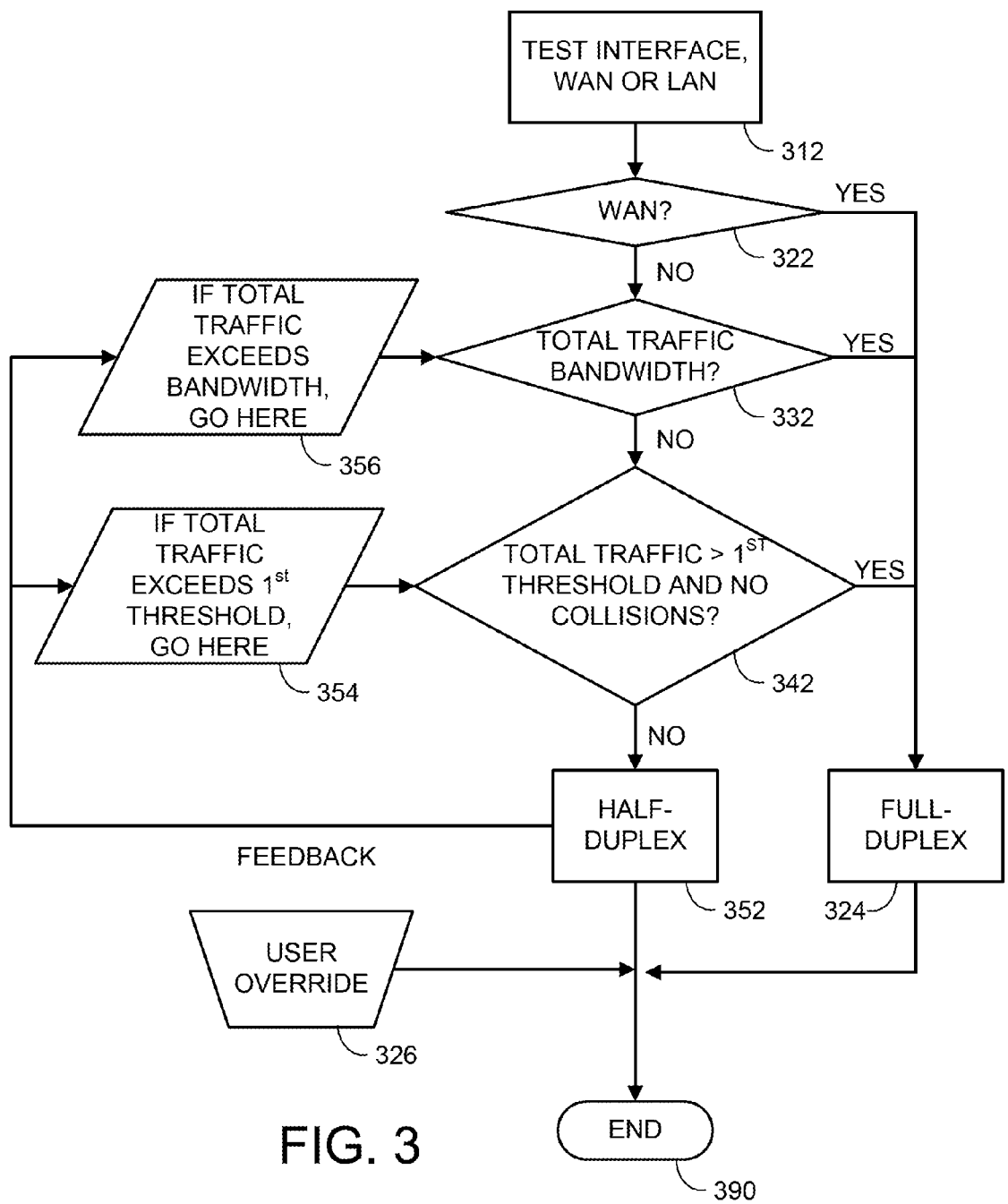
FIG. 3 depicts a flow diagram of an embodiment of the current invention.

In one embodiment, as illustrated in FIG. 3, SNMP is used to examine whether an interface is a LAN or a WAN interface at step 312. Since most WAN interfaces operate in a serial full-duplex mode, if a WAN interface is detected at step 322 the interface may automatically be determined to be a full-duplex interface at step 324 and the full-duplex calculation is used. At step 326, the user (e.g., the network administrator) may manually re-configure (or override) the duplex mode that was automatically in accordance with FIG. 3.

If the interface is a LAN interface as detected at step 322, more comprehensive heuristic steps are used to determine the interface's operational mode. The initial assumption is that the interface is a half-duplex interface. The network traffic at the interface is sampled and examined at step 332. If the total traffic (sum of input and output traffic) is greater than the bandwidth of the interface, (that is, if the half-duplex bandwidth utilization exceeds 100%), the interface is determined to be operating in a full-duplex mode and the full-duplex bandwidth utilization calculation is used in step 324. Total traffic exceeding the bandwidth of an interface means that the interface is running in full duplex mode regardless of the type of the interface. This is a rule of general applicability to all interfaces. Once detected as a full-duplex interface, the interface will continue to be considered a full-duplex interface regardless of traffic rate until such time that the user manually reconfigures the interface as functioning in half-duplex mode. The user may manually override the auto-detection in step 326.

If the total traffic is less than the assumed bandwidth, further examination is necessary. The typical operating characteristic of today's most common LAN interface is Ethernet. Ethernet is based on the Carrier Sense Multiple Access-Collision Detection (CSMA/CD) medium access protocol which allows interfaces on the network to transmit data at will ("Multiple Access"). Collisions between independently initiated transmissions are detected ("Collision Detection") and resolved by the protocol. Each time a collision occurs, a collision counter at the interface is incremented such that the collision counter will keep track of the total number of collisions since the last time the counter was reset.

In the classic Ethernet deployment of half duplex interfaces sharing a network medium, this operation results in mostly collision free network access while the network utilization is low. As the network utilization grows, however, so does the number of collisions, finally saturating the network at some level of utilization, typically at around 60%. In other words, utilization in a classic Ethernet deployment (half duplex interfaces sharing medium) will not approach 100% and there will be a large number of collisions at much lower utilizations. This phenomenon is used to more accurately determine the interface mode in the current invention.

Total traffic is compared to a first threshold at step 342. If it is above this first threshold while no collisions occur on the interface, at step 342, it will be assumed to mean that the interface is operating in full-duplex mode and the appropriate bandwidth utilization calculation for full-duplex mode will be used, as at step 324. The default value of this threshold is about 20-60% of the interface bandwidth. One of ordinary skill in the art will recognize that other collision levels (i.e., more than "no collisions") and/or thresholds (i.e., less than 20% or greater than 60%) may be used without departing from the inventive technique. This threshold may be modified by the user manually, based on the network implementation and past experience with a particular network segment. Once detected as a full-duplex interface, the interface will continue to be considered a full-duplex interface regardless of traffic rate until such time that the user manually reconfigures the interface as functioning in half-duplex mode, at step 326.

If the total traffic is less than the first threshold, then whether the interface is operating in half-duplex or full-duplex is not important, because the network traffic is very light and there is additional bandwidth for network traffic. In this case, the initial assumption that the interface is operating in half-duplex is maintained at step 352.

The process may be repeated. If the total traffic exceeds the first threshold at step 354, the process will go back to step 342 to check whether there are any collisions. If the total traffic exceeds the total bandwidth, as observed at step 356, the process will go to step 332.

The process in this embodiment of the invention allows for the automatic detection of an interface's operational mode by using heuristics based on the operational characteristics of the interface in an attempt to determine the likely interface mode so that the appropriate total bandwidth utilization calculation can be applied.

In addition, after determining the interface to be full-duplex mode, the first threshold may be replaced with a second threshold that is equal to or greater than the first threshold. When the full-duplex bandwidth utilization exceeds the second threshold, the network monitor may set off an alarm to inform the network administrator that interface traffic is approaching the full capacity. Some adjustment may be necessary to avoid network traffic congestion. It may also indicate that the network interface capacity expansion may be imminent. The second threshold may be 30%-90%, depending on the network configuration and past experience with a particular segment of the network and the interfaces.

In a commercial implementation of the current invention by BMC Software, Inc., the PATROL DashBoard Availability Module (version 6.6.00.02) LAN interfaces default to half-duplex, unless detected otherwise and WAN interfaces default to full-duplex. The bandwidth utilization information is stored with the annotation of data points in the PATROL DashBoard bandwidth utilization graphs. The bandwidth utilization, in terms of percentage of total bandwidth, or input percentage and output percentage, is presented together with a notation of whether the duplex mode is: AHD (auto-detected half-duplex), AFD (auto-detect full-duplex), CHD (manually configured to half-duplex), or CFD (manually configured to full-duplex). This information makes it easier for network administrators to do network operation analysis, performance tuning and future capacity planning.

In the present invention, not all the steps shown in FIG. 3 are necessary. In a second embodiment, the only steps necessary to implement the invention include: step 342 to check whether total traffic exceeds a first threshold and whether there are collisions in the interface; steps 324, 352 and 354, depending on the result of step 342. In this embodiment, the least number of steps are used and the change in network management applications and/or the network agent may be minimized. The operation of the network agent and the network manager application is only changed when it is absolutely necessary to determine the interface is operating in full-duplex mode, when the network traffic is heavy. When the network traffic is heavy, the wrong calculation of bandwidth utilization may reduce the interface utilization and result in premature and costly replacement of network interface or devices. Use of techniques in accordance with the invention may avoid such costly errors. When the network traffic is light, even though the calculation of bandwidth utilization is wrong, there is no substantial adverse effect on the network management. Therefore, such errors can be tolerated. The second embodiment of the invention does not prevent such errors in some situations.

In a third embodiment, a process in accordance with the invention may include the steps from step 332 and on. In other words, only the testing of interface type at steps 312 and 322 is omitted.

In the embodiments discussed above, the interface information is collected by an SNMP agent on the interface and the information is used by a network monitor to do the analysis and make determination. Such separation of tasks is a mere design choice, rather than a limitation of the current invention. All analysis and determination may be done by the agent on the interface. In one alternative, only the determined mode of the interface and the appropriately calculated bandwidth utilization are sent to the network monitor. To further reduce the burden on the network monitor, in another alternative, this information may be sent to the network monitor only when an alarm condition is present, i.e. when there are excessive collision in the interface or when the full-duplex bandwidth utilization exceeds the its threshold, which is greater than or equal to the half-duplex threshold.

While illustrative embodiments of the invention have been illustrated and described, it will be appreciated that various changes can be made therein without departing from the spirit and scope of the invention.

We claim:

1. An interface operational mode detection method, comprising:
    obtaining traffic data for an interface at a network manager of a network system;
    calculating a first bandwidth utilization value for the interface based on the obtained traffic data and a half-duplex operating mode, wherein the first bandwidth utilization is:

$$\text{Utilization} = \frac{(\Delta ifInOctets + \Delta ifOutOctets) \times 8 \times 100}{(\Delta t) \times ifSpeed},$$

wherein $\Delta t$ is a time period, $\Delta ifInOctets$ is the number of Octets the interface received during $\Delta t$, $\Delta ifOutOctets$ is the number of Octets the interface transmitted during $\Delta t$, and ifSpeed is the transmission speed of the interface;
    if the calculated first bandwidth utilization value is greater than one hundred percent (100%), determining the interface is a full-duplex interface;
    else, if the calculated first bandwidth utilization value is greater than a first threshold and if a collision count is less than a second value, determining the interface is a full-duplex interface;
    else determining the interface is a half-duplex interface; and
    managing the interface with the network manager based on the determination.

2. The method of claim 1, wherein the act of obtaining traffic data comprises using a Simple Network Management Protocol (SNMP) to query the interface for the traffic data.

3. The method of claim 2, further comprising:
    using SNMP to determine whether the interface is a LAN interface or a WAN interface; and
    determining the interface to be full-duplex mode if the interface is a WAN interface.

4. The method of claim 2, wherein the collision count is obtained using an SNMP query.

5. The method of claim 1, further comprising:
    if the collision count exceeds the second value, setting off an alarm.

6. The method of claim 5, wherein the second value is 1 or 100.

7. The method of claim 1, wherein the first threshold is about 20-60%.

8. The method of claim 1, comprising:
    accepting an instruction from the network manager to determine the interface to be full-duplex mode or half-duplex mode and override a prior determination.

9. A program storage device, readable by a programmable control device, comprising instructions stored on the program storage device for causing the programmable control device to perform an interface operational mode detection method, comprising:
    obtaining traffic data for an interface;
    calculating a first bandwidth utilization value for the interface based on the obtained traffic data and a half-duplex operating mode,
    wherein the first bandwidth utilization is:

$$\text{Utilization} = \frac{(\Delta ifInOctets + \Delta ifOutOctets) \times 8 \times 100}{(\Delta t) \times ifSpeed},$$

and
   wherein $\Delta t$ is a time period, $\Delta ifInOctets$ is the number of Octets the interface received during $\Delta t$, $\Delta ifOutOctets$ is the number of Octets the interface transmitted during $\Delta t$, and ifSpeed is the transmission speed of the interface;
    if the calculated first bandwidth utilization value is greater than one hundred percent (100%), determining the interface is a full-duplex interface;
    else, if the calculated first bandwidth utilization value is greater than a first threshold and if a collision count is less than a second value, determining the interface is a full-duplex interface;
    else determining the interface is a half-duplex interface.

10. The program storage device as in claim 9, wherein the act of obtaining traffic data comprises using a Simple Network Management Protocol (SNMP) to query the interface for the traffic data.

11. The program storage device as in claim 10, wherein the method further comprises:
using SNMP to determine whether the interface is a LAN interface or a WAN interface; and
determining the interface to be full-duplex mode if the interface is a WAN interface.

12. A network computer system in a digital network having a network interface agent reporting to a network manager, the network manager operative to:
obtain traffic data from the interface;
calculate a first bandwidth utilization value for the interface based on the obtained traffic data and a half-duplex operating mode,
wherein the first bandwidth utilization is:

$$\text{Utilization} = \frac{(\Delta ifInOctets + \Delta ifOutOctets) \times 8 \times 100}{(\Delta t) \times ifSpeed},$$

and
wherein $\Delta t$ is a time period, $\Delta ifInOctets$ is the number of Octets the interface received during $\Delta t$, $\Delta ifOutOctets$ is the number of Octets the interface transmitted during $\Delta t$, and ifSpeed is the transmission speed of the interface;
if the calculated first bandwidth utilization value is greater than one hundred percent (100%), determine the interface is a full-duplex interface;
else, if the calculated first bandwidth utilization value is greater than a first threshold and if a collision count is less than a second value, determine the interface is a full-duplex interface;
else determine the interface is a half-duplex interface.

13. The network computer system of claim 12, wherein obtain traffic data comprises using a Simple Network Management Protocol (SNMP) to query the interface for the traffic data.

14. The network computer system of claim 13, wherein the network manager is further operative to:
use SNMP to determine whether the interface is a LAN interface or a WAN interface; and
determine the interface to be full-duplex mode if the interface is a WAN interface.

15. The network computer system of claim 13, wherein the collision count is obtained using an SNMP query.

16. The network computer system of claim 12, wherein the network manager is further operative to set off an alarm if the collision count exceeds the second value.

17. The program storage device of claim 10, wherein the collision count is obtained using an SNMP query.

18. The program storage device of claim 9, further comprising setting off an alarm if the collision count exceeds the second value.

19. The program storage device of claim 18, wherein the second value is 1 or 100.

20. The program storage device of claim 9, wherein the first threshold is about 20-60%.

21. The program storage device of claim 9, comprising accepting an instruction from the network manager to determine the interface to be full-duplex mode or half-duplex mode and override a prior determination.

22. The network computer system of claim 16, wherein the second value is 1 or 100.

23. The network computer system of claim 12, wherein the first threshold is about 20-60%.

24. An interface operational mode detection method, comprising:
obtaining traffic data for an interface at a network manager of a network system;
calculating a first bandwidth utilization value for the interface based on the obtained traffic data and a half-duplex operating mode, wherein the first bandwidth utilization is based on transmissions the interface has received and transmitted during a time period;
if the calculated first bandwidth utilization value is greater than one hundred percent (100%),
determining the interface is a full-duplex interface;
calculating a full-duplex mode bandwidth utilization for the interface, the full-duplex mode bandwidth utilization being:

$$FullDuplexBandwidthUtilization = \frac{\text{Max}(\Delta ifInOctets, \Delta ifOutOctets) \times 8 \times 100}{(\Delta t) \times ifSpeed},$$

wherein $\Delta t$ is a time period, $\Delta ifInOctets$ is the number of Octets the interface received during $\Delta t$, $\Delta ifOutOctets$ is the number of Octets the interface transmitted during $\Delta t$, and ifSpeed is the transmission speed of the interface;
replacing the first threshold with a third threshold, the third threshold being greater than or equal to the first threshold; and
setting off an alarm if the full-duplex mode bandwidth utilization exceeds the third threshold;
else, if the calculated first bandwidth utilization value is greater than a first threshold and if a collision count is less than a second value, determining the interface is a full-duplex interface;
else determining the interface is a half-duplex interface; and
managing the interface with the network manager based on the determination.

25. The method of claim 24,
wherein the first bandwidth utilization is:

$$\text{Utilization} = \frac{(\Delta ifInOctets + \Delta ifOutOctets) \times 8 \times 100}{(\Delta t) \times ifSpeed};$$

wherein $\Delta t$ is a time period, $\Delta ifInOctets$ is the number of Octets the interface received during $\Delta t$, $\Delta ifOutOctets$ is the number of Octets the interface transmitted during $\Delta t$, and ifSpeed is the transmission speed of the interface.

26. The method of claim 24, wherein the act of obtaining traffic data comprises using a Simple Network Management Protocol (SNMP) to query the interface for the traffic data.

27. The method of claim 26, further comprising:
using SNMP to determine whether the interface is a LAN interface or a WAN interface; and
determining the interface to be full-duplex mode if the interface is a WAN interface.

28. The method of claim 26, wherein the collision count is obtained using an SNMP query.

29. The method of claim 24, further comprising setting off an alarm if the collision count exceeds the second value.

30. The method of claim 29, wherein the second value is 1 or 100.

31. The method of claim 24, wherein the first threshold is about 20-60%, and wherein the third threshold is about 30%-90%.

32. The method of claim 24, comprising accepting an instruction from the network manager to determine the interface to be full-duplex mode or half-duplex mode and override a prior determination.

33. A program storage device, readable by a programmable control device, comprising instructions stored on the program storage device for causing the programmable control device to perform an interface operational mode detection method, comprising:

obtaining traffic data for an interface;
calculating a first bandwidth utilization value for the interface based on the obtained traffic data and a half-duplex operating mode, wherein the first bandwidth utilization is based on transmissions the interface has received and transmitted during a time period;
if the calculated first bandwidth utilization value is greater than one hundred percent (100%),
determining the interface is a full-duplex interface;
calculating a full-duplex mode bandwidth utilization for the interface, the full-duplex mode bandwidth utilization being:

$$FullDuplexBandwidthUtilization = \frac{\text{Max}(\Delta ifInOctets, \Delta ifOutOctets) \times 8 \times 100}{(\Delta t) \times ifSpeed},$$

wherein $\Delta t$ is a time period, $\Delta ifInOctets$ is the number of Octets the interface received during $\Delta t$, $\Delta ifOutOctets$ is the number of Octets the interface transmitted during $\Delta t$, and $ifSpeed$ is the transmission speed of the interface;
replacing the first threshold with a third threshold, the third threshold being greater than or equal to the first threshold; and
setting off an alarm if the full-duplex mode bandwidth utilization exceeds the third threshold;
else, if the calculated first bandwidth utilization value is greater than a first threshold and if a collision count is less than a second value, determining the interface is a full-duplex interface;
else determining the interface is a half-duplex interface.

34. The program storage device as in claim 33, wherein the first bandwidth utilization is:

$$Utilization = \frac{(\Delta ifInOctets + \Delta ifOutOctets) \times 8 \times 100}{(\Delta t) \times ifSpeed};$$

wherein $\Delta t$ is a time period; $\Delta ifInOctets$ is the number of Octets the interface received during $\Delta t$; $\Delta ifOutOctets$ is the number of Octets the interface transmitted during $\Delta t$; and $ifSpeed$ is the transmission speed of the interface.

35. The program storage device as in claim 33, where the act of obtaining traffic data comprises using a Simple Network Management Protocol (SNMP) to query the interface for the traffic data.

36. The program storage device as in claim 35, wherein the method further comprises:
using SNMP to determine whether the interface is a LAN interface or a WAN interface; and
determining the interface to be full-duplex mode if the interface is a WAN interface.

37. The program storage device of claim 35, wherein the collision count is obtained using an SNMP query.

38. The program storage device of claim 33, further comprising setting off an alarm if the collision count exceeds the second value.

39. The program storage device of claim 38, wherein the second value is 1 or 100.

40. The program storage device of claim 33, wherein the first threshold is about 20-60%, and wherein the third threshold is about 30%-90%.

41. The program storage device of claim 33, comprising accepting an instruction from the network manager to determine the interface to be full-duplex mode or half-duplex mode and override a prior determination.

42. A network computer system in a digital network having a network interface agent reporting to a network manager, the network manager operative to:

obtain traffic data from the interface;
calculate a first bandwidth utilization value for the interface based on the obtained traffic data and a half-duplex operating mode, wherein the first bandwidth utilization is based on transmissions the interface has received and transmitted during a time period;
if the calculated first bandwidth utilization value is greater than one hundred percent (100%),
determine the interface is a full-duplex interface,
calculate a full-duplex mode bandwidth utilization for the interface, the full-duplex mode bandwidth utilization being:

$$FullDuplexBandwidthUtilization = \frac{\text{Max}(\Delta ifInOctets, \Delta ifOutOctets) \times 8 \times 100}{(\Delta t) \times ifSpeed},$$

wherein $\Delta t$ is a time period, $\Delta ifInOctets$ is the number of Octets the interface received during $\Delta t$, $\Delta ifOutOctets$ is the number of Octets the interface transmitted during $\Delta t$, and $ifSpeed$ is the transmission speed of the interface
replace the first threshold with a third threshold, the third threshold being greater than or equal to the first threshold; and
set off an alarm if the full-duplex mode bandwidth utilization exceeds the third threshold;
else, if the calculated first bandwidth utilization value is greater than a first threshold and if a collision count is less than a second value, determine the interface is a full-duplex interface;
else determine the interface is a half-duplex interface.

43. The network system of claim 42, wherein the first bandwidth utilization is:

$$Utilization = \frac{(\Delta ifInOctets + \Delta ifOutOctets) \times 8 \times 100}{(\Delta t) \times ifSpeed};$$

wherein $\Delta t$ is a time period; $\Delta ifInOctets$ is the number of Octets the interface received during $\Delta t$; $\Delta ifOutOctets$ is the number of Octets the interface transmitted during $\Delta t$; and ifSpeed is the transmission speed of the interface.

44. The network computer system of claim 42, wherein obtain traffic data comprises using the Simple Network Management Protocol (SNMP) to query the interface for the traffic data.

45. The network computer system of claim 44, wherein the network manager is further operative to:
 use SNMP to determine whether the interface is a LAN interface or a WAN interface; and
 determine the interface to be full-duplex mode if the interface is a WAN interface.

46. The network computer system of claim 44, wherein the collision count is obtained using an SNMP query.

47. The network computer system of claim 42, wherein the network manager is further operative to set off an alarm if the collision count exceeds the second value.

48. The network computer system of claim 47, wherein the second value is 1 or 100.

49. The network computer system of claim 42, wherein the first threshold is about 20-60%, and wherein the third threshold is about 30%-90%.

* * * * *